United States Patent
Cawley

[11] 3,935,154
[45] Jan. 27, 1976

[54] BLOCK COPOLYESTERS OF POLYSILOXANES

[75] Inventor: John Duval Cawley, Rochester, N.Y.

[73] Assignee: Eastman Kodak Company, Rochester, N.Y.

[22] Filed: Sept. 24, 1974

[21] Appl. No.: 508,800

Related U.S. Application Data

[62] Division of Ser. No. 346,373, March 30, 1973, Pat. No. 3,861,915.

[52] U.S. Cl. ... 260/33.8 SB; 260/46.5 R; 260/824 R
[51] Int. Cl.² .......................................... C08K 5/02
[58] Field of Search ....... 260/824 R, 46.5 R, 75 SB, 260/47 R, 33.8 SB

[56] References Cited
UNITED STATES PATENTS 3,701,815  10/1972  Matzner et al..................... 260/824

Primary Examiner—Lewis T. Jacobs
Attorney, Agent, or Firm—A. H. Rosenstein

[57] ABSTRACT

Solvent soluble block copolyesters consisting essentially of units having the formula:

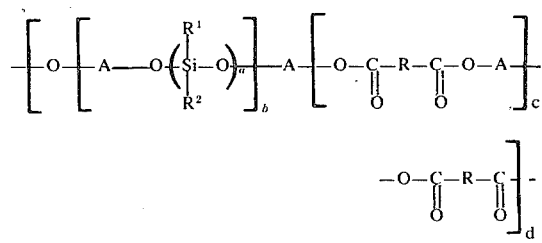

wherein R is an alkylene radical containing at least 3 carbon atoms; $R^1$ is an alkyl radical and $R^2$ is an alkyl, alkaryl, aralkyl or aryl radical; A is an alkylene or arylene radical; $a$ is an integer of at least 10; $b$ is an integer of at least 1; $c$ is an integer of at least 2; and $d$ is an integer of at least 2; are formed by first reacting a dihalo-polydiorganosiloxane with a dihydric phenol or other diol and subsequently reacting the resulting reaction product with a dicarboxylic acid halide. These polymers are useful as release agents and leveling agents and find particular utility as abhesive materials for waterless lithographic printing plates.

26 Claims, No Drawings

BLOCK COPOLYESTERS OF POLYSILOXANES

This is a division of application Ser. No. 346,373, filed Mar. 30, 1973 now U.S. Pat. No. 3,861,915 issued Jan. 21, 1975.

This invention relates to a novel class of block copolyesters of polyorganosiloxanes and a method of preparing these copolyesters.

Materials having good release or anti-blocking properties as well as good leveling properties, commonly referred to as release agents or leveling agents, are desirable for many applications. Common applications include adhesive tapes and use in certain non-aqueous resin systems. Release and leveling agents are also known to be useful in photographic applications, such as in photographic elements, when they are compatible with the remaining materials of the photographic elements. For example, these materials must not deleteriously affect the physical or sensitometric characteristics of the photographic elements. Release and leveling agents find particular utility in electrophotographic films and in this application are typically chosen to be compatible with the composition of the photoconductive layers present. Generally, it is preferred to add these release or leveling agents directly to the photosensitive compositions as addenda rather than to apply the release or leveling agent in a separate layer. This avoids the added expense and complexity of additional coating steps.

More specifically, in the photographic field, planographic printing plates containing oleophilic image areas and abhesive non-image background areas require as either a separate layer of, or as addenda certain leveling and release agents for photoconductive elements. These agents reduce the friction between the toner and carrier against the film and present an ink repellent abhesive surface in the non-image areas.

In planographic printing, as the term implies, both the image and non-image areas lie substantially in the same plane. The non-image areas are ink-repellent so that when ink is applied with a roller to the plate surface, only the image areas accept the ink for transfer to a copy sheet. Conventional lithography works on the principle that water and oil are immiscible. The non-image areas are made water-receptive (hydrophilic), and when water-wet they repel the oily ink. The image areas are ink-receptive (organophilic) and water-repellent (hydrophobic). In use on a press, the plate conventionally is first dampened with an aqueous fountain solution (which wets the background or non-image areas), after which ink is rolled over the plate. The ink coats the image areas, but is repelled from the dampened non-image areas.

Several recent publications, such as Gipe British Pat. No. 1,146,618 and Curtin U.S. Pat. No. 3,511,178, relate to lithographic printing plates which eliminate the use of aqueous fountain solutions and dampening agents. These publications have revived interest in the use of lithographic plates which are adapted to planographic printing processes without the use of conventional water dampening agents. In these plates, the non-image areas are formed of abhesive organopolysiloxane materials which are both ink repellent and water repellent. In fact these organopolysiloxane materials, for reasons not fully understood, exhibit little or no adherence to a large number of materials. Other lithographic printing elements adapted for planographic printing without the use of conventional water dampening or fountain solutions are described in a series of Greubel and Greubel et al patents including U.S. Pat. Nos. 3,225,419; 3,269,836; 3,241,486; 3,221,650; 3,209,683; and 3,167,005. Another similar series of patents which have described such "waterless" lithographic printing processes are the following patents: U.S. Pat. Nos. 1,886,817; 1,741,758; RE 18,013; 1,893,163; 1,892,875; 1,949,233; and 1,976,039.

One process which eliminates fountain solutions uses a diazo sensitized aluminum plate overcoated with a silicone rubber layer. On image-wise exposure through a negative, the light-struck image areas of the plate become soluble in an organic solvent. Developing with this solvent produces a plate with bare metal corresponding to the image areas and silicone elastomer in the non-image areas. The ink then adheres to the image areas only. As noted, this process described in U.S. Pat. No. 3,511,178, requires a separate overcoat layer. If light-sensitive materials such as sensitizing dyes or photoconductors are substituted for the light sensitive diazo materials used in this process, it is found that such materials tend to migrate into the silicone layer causing loss of repellency. Further, the use of these materials produces significant toner background densities. The silicone rubber or elastomer used in U.S. Pat. No. 3,511,178 also requires cross-linking and is generally unstable. These elastomers are not compatible with many photoconductive binder systems.

It is an object of this invention to provide novel block copolymers which have excellent leveling and release properties.

It is another object of this invention to provide a method for making these novel block copolymers.

Still another object of this invention is to provide novel copolymers useful as additives in electrophotographic compositions for single layer planographic printing plates which may be utilized directly without the necessity of a fountain solution and which eliminate the problem of migration of sensitizing dyes and photoconductors.

A still further object of this invention is to provide novel copolymers unique in single layer, reusable electrophotographic films with improved surface characteristics including the prevention of excessive wear and permanent toner deposition with little effect on film sensitometry.

These and other objects are accomplished, in one aspect, by novel block copolyesters formed by reacting a dihalopolyorganosiloxane comprising from about 10 to about 200 chemically combined diorganosiloxy units consisting essentially of organosiloxy units wherein each of the silicone atoms has 2 hydrocarbon radicals attached through a carbon-silicon bond, with an aliphatic or aromatic diol and thereafter reacting the polysiloxane-diol product with an aliphatic dicarboxylic acid halide containing at least 5 carbon atoms. The resulting solvent-soluble thermoplastic block copolymers have excellent release and leveling properties and are resistant to hydrolysis. As a consequence, these polymers have utility as release agents and have particular utility in waterless lithography.

The solvent soluble block copolyester produced has a molecular weight of at least 10,000 and an inherent viscosity greater than 0.2 in chloroform, and has the formula:

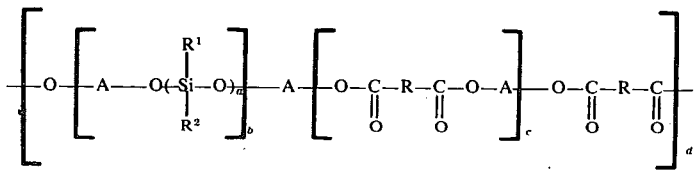

wherein R is an alkylene radical containing at least 3 carbon atoms, A is a member of the group consisting of arylene radicals and alkylene radicals, $R^1$ is an alkyl radical and $R^2$ is selected from the group consisting of alkyl, alkaryl, aralkyl, and aryl groups, $a$ is an integer of at least 10, $b$ is an integer of at least 1, $c$ is an integer of at least 2, and $d$ is an integer of at least 2.

DETAILED DESCRIPTION OF PREFERRED EMBODIMENTS OF THIS INVENTION

The thermoplastic solvent soluble block copolyesters of this invention have a molecular weight of at least about 10,000 and an inherent viscosity of at least 0.2 in chloroform at 25°C and are represented by the formula:

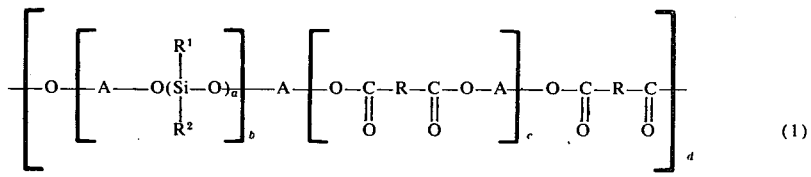

(1)

wherein R is an alkylene radical containing at least 3 carbon atoms such as propylene, butylene, pentylene, hexylene, octylene, decylene, dodecylene, cyclohexylene, cyclopentylene and the like. The alkylene radical preferably contains from about 3 to about 20 carbon atoms. It is noted that the block copolymers of this invention cannot be formed if R is a methylene or ethylene radical.

As employed herein, the terms "alkylene" and "alkyl" are inclusive of cycloalkylene and cycloalkyl groups in each occurence.

A is selected from the group consisting of alkylene and arylene radicals. Exemplary preferred alkylene radicals are those containing from about 2 to 25 carbon atoms, such as ethylene, propylene, butylene, pentylene, hexylene, cyclopentylene, cyclohexylene, octylene, decylene and the like; exemplary preferred arylene radicals include phenylene radicals and bisphenylene radicals. Preferred bisphenylene radicals are those having the formula:

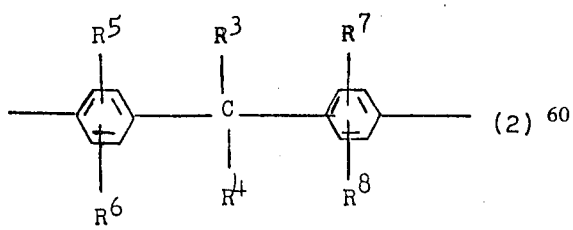

(2)

wherein $R^3$ and $R^4$ are independently selected from the group consisting of hydrogen atoms; alkyl radicals, preferably containing from 1 to 12 carbon atoms such as methyl, ethyl, propyl, octyl, cyclohexyl, cyclopentyl, and the like; substituted alkyl radicals such as fluoromethyl, difluoromethyl, dichlorofluoromethyl and the like; aryl radicals such as phenyl, naphthyl, anthracenyl and the like; and substituted aryl radicals such as 3,4-dichlorophenyl and 2,4-dichlorophenyl and the like. $R^3$ and $R^4$ taken together with the carbon atom to which they are attached can represent a monocyclic, dicyclic, or heterocyclic moiety containing 6 to 14 carbon atoms in the ring structures thereof such as cyclohexyl, phenyl, naphthyl, norbonyl, piperidino and the like. $R^5$, $R^6$, $R^7$ and $R^8$, which can be the same or different are selected from the group consisting of hydrogen atoms, alkyl radicals, preferably containing from 1 to 12 carbon atoms such as methyl, ethyl, hexyl, cyclohexyl, cyclopentyl; substituted alkyl such as chloromethyl, dichlorofluoromethyl and the like; aryl radicals such as phenyl, nathphyl, anthracenyl; substituted aryl radicals such as 2,4-dichlorophenyl and the like; halogen atoms; dialkylamino radicals; cyano radicals; alkoxy radicals and the like.

$R^1$ is an alkyl radical preferably containing from about 1 to about 10 carbon atoms such as ethyl, propyl, isopropyl, butyl, tertiary-butyl, pentyl, octyl, nonyl, decyl, cyclopentyl, cyclohexyl, and the like; $R^2$ is selected from the group consisting of $R^1$; aryl radicals such as phenyl, naphthyl, anthracenyl and the like; aralkyl radicals wherein the alkyl portion preferably contains from 1 to 10 carbon atoms such as benzyl, phenethyl, naphthylethyl, and the like; and alkaryl racials wherein the alkyl portion preferably contains from 1 to 10 carbon atoms such as ethylphenyl and the like. It is pointed out that only one of $R^1$ and $R^2$ may be aryl, alkaryl or aralkyl, although in the preferred embodiment $R^1$ and $R^2$ are both alkyl. Thus, at least one of $R^1$ and $R^2$ must be alkyl to avoid steric hindrance. If both radicals were aryl radicals a polymer having an unacceptably low molecular weight would result.

$b$ is at least 1 and preferably from 1 to 25. $a$ is at least 10 and preferably from about 10 to about 200. $c$ is at least 2 and preferably from about 5 to about 20 and $d$ is at least 2 and preferably from about 2 to about 1000.

The polymers must have a molecular weight as determined by the gel permeation method of at least about 10,000 and preferably from about 10,000 to about 1,000,000 or greater. The inherent viscosity is at least 0.2 as measured at 25°C in chloroform ($CHCl_3$) and preferably higher such as 0.3 to 1.5. In order to be useful as coating materials, these polymers should be solvent soluble. Preferred solvents are halohydrocarbons such as chlorohydrocarbons.

In a particularly preferred embodiment of this invention *a* is from 10 to 200, *b* is 2 to 3, *c* is 5 to 20 and *d* is at least 2. A is

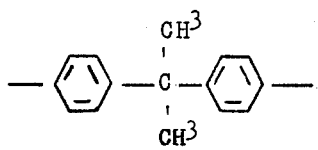

R¹ and R² are CH₃, and R is octylene.

In another particularly preferred embodiment of this invention, *a* is from 10 to 200, *b* is 2 to 3, *c* is 2, *d* is at least 2, A is butylene, R¹ and R² are CH₃, and R is octylene.

Some examples of the block copolyesters of this invention are poly [4,4'-isopropylidenediphenylene-co-block-poly-(dimethylsiloxanediyl)sebacate]; poly [1,4-butylene-co-block-poly(dimethylsiloxanediyl)sebacate]; poly [4,4'-isopropylidenediphenylene-co-block-poly(dimethylsiloxanediyl)glutarate; poly [1,4-butylene-co-block-poly(dimethylsiloxanediyl)adipate] and the like.

The novel block copolyesters of this invention are formed by first reacting a dihalo-polydiorganosiloxane comprising from about 10 to about 200 chemically combined diorganosiloxy units consisting essentially of diorganosiloxy units where each of the silicon atoms have 2 organo radicals attached to a carbonsilicon bond with a dihydric phenol or other diol and subsequently reacting the reaction product with an aliphatic dicarboxylic acid halide containing at least 5 carbon atoms.

The dihalo-polydiorganosiloxane which may be reacted with the diol is generally chain stopped with a halogen and generally has the formula:

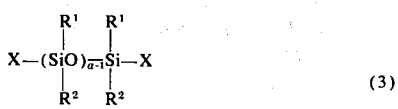

(3)

wherein R¹ and R² are as described above. *a* Is from about 10 to 200 and X is a halogen atom such as chlorine or bromine. These α,Ω halogenated polysiloxanes and the methods of preparing them are described in U.S. Pat. No. 3,189,662, issued June 15, 1965.

The α,Ω-dihalo-polydiorganosiloxanes are reacted with an aliphatic or aromatic diol. The preferred aromatic diol is a dihydric phenol.

The dihydric phenols which may be reacted with the dihalo-polydiorganosiloxanes are preferably of the formula:

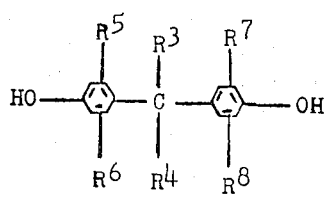

(4)

wherein R³, R⁴, R⁵, R⁶, R⁷, and R⁸ are as defined above. Examples of preferred dihydric phenols which can be used herein are 2,2-bis-(4-hydroxyphenyl)propane(bisphenol A); 2,2-bis(4-hydroxy-3,5 dichlorophenyl)-propane(tetrachlorobisphenol A); 1-phenyl-1,1-bis(4-hydroxyphenyl)ethane; 1-(3,4-dichlorophenyl)-1,1-bis(4-hydroxyphenyl)ethane; 2,2-bis-(4-hydroxyphenyl)-4-[3-(2,3,4,5-tetrahydro -2,2-dimethyl-4-oxafuryl)]butane; bis(4-hydroxyphenyl)-methane; 2,4-dichlorophenylbis-(4-hydroxyphenyl)methane; 1,1-bis-(4-hydroxyphenyl)cyclohexane; 1,1,1,3,3,3-hexafluoro-2,2-bis(4-hydroxyphenyl)propane; and diphenyl bis-(4-hydroxypheny)-methane.

Other diols which may be reacted with the α,Ω-dihalopolydiorganosiloxanes are alkylene diols or other aromatic diols, generally having the formula:

$$HO-R^9-OH \qquad (5)$$

wherein R⁹ is alkylene or arylene containing from about 2 to about 25 carbon atoms such as ethylene, propylene, butylene, octylene, cyclohexylene, phenylene and the like. Examples of diols useful herein are ethylene glycol, 1,3-propanediol, 1,4-butanediol, 1,5-pentanediol, 1,6-hexanediol, 1,8-octanediol, 1,9-nonanediol, 1,12-dodecanediol, 1,4-cyclohexanedimethanol, hydroquinone, hydroquinone substituted with alkyl groups or halogen atoms, and resorcinol.

The diol may be reacted with the alpha,Ω-dihalopolydiorganosiloxane at room temperature or higher in the presence of inert solvent. A hydrogen halide acceptor such as pyridine or triethylamine may also be employed. Suitable solvents which may be used are chlorohydrocarbons, such as chlorobenzene, methylene chloride, 1,2-dichloroethane and the like. The preferred temperature range is from about 25°C to about 250°C and the most preferred temperatures are from 25°C to 100°C.

The proportion of siloxane and diol or dihydric phenol used may be varied greatly depending on the final properties desired. Generally, however, 0.15 part by weight to about 3 parts by weight of the α,Ω-dihalopolydiorganosiloxane per part of diol are employed.

The above reaction product is subsequently reacted with an aliphatic dicarboxylic acid halide to form the block copolyesters of this invention.

The dicarboxylic acid halide must necessarily contain at least 5 carbon atoms to form the block-copolyester and must be aliphatic in order to have the required solubility in solvents such as chlorohydrocarbons. The acid halides generally have the formula:

$$XOOC\text{-}R\text{-}COOX \qquad (6)$$

wherein R is as described above and X is a halogen atom such as chlorine or bromine.

Examples of dicarboxylic acid halides useful herein are the halides of glutaric acid, adipic acid, pimelic acid, azelaic acid, sebacic acid, 2-methyl adipic acid, cyclohexane-1,3-dicarboxylic acid, cyclohexane-1,4-dicarboxylic acid, cyclopentane-1,3-dicarboxylic acid and the like such as sebacylchloride, adipyl chloride, glutaryl chloride and the like.

The dicarboxylic acid halide may be merely mixed with the reaction product of diol and polydiorganosiloxane to form the block copolyester. It is preferred to mix the reactants in a solvent and a hydrogen halide acceptor. Preferred solvents are the chlorohydrocarbons described above. The reaction may be carried out at room temperature and in the absence of catalysts. The preferred temperature range is from about 25°C to about 250°C and particularly preferred temperatures are from 25°C to 100°C.

The proportions of diol-siloxane reaction product and dicarboxylic acid halide may be varied over a wide range. It is preferred however to use as many moles of dicarboxylic acid halide as there are moles of diol minus the number of moles of polyorganosiloxane.

The compounds employed in making the copolymers of the invention are prepared from readily available inexpensive materials.

The novel block copolymers are suitable for a wide variety of uses requiring good leveling and release properties and are particularly useful in the photographic field as release agents for photoconductive materials.

As discussed previously, the block copolyesters of this invention may be added to photoconductive elements to provide waterless lithographic printing plates having smooth and uniform surfaces with improved cleaning properties, improved liquid and dry toner adhesion, and which are stable to humidity. Thus, a waterless printing plate is prepared by coating a film support which is electrically conductive or has a conductive overlayer with a composition containing a binder and a photoconductor and preferably from about 0.05% to about 2% by weight of the novel block copolyester of this invention. The element is then exposed imagewise and developed, and the ink will adhere only to the image areas.

The following examples illustrate the preparation and use of the novel block copolyesters of this invention:

PREPARATION OF ALPHA,Ω-DICHLORO(POLYDIMETHYLSILOXANE)

A mixture of 800G of dichlorodimethylsilane, 100g of water and 206g of dioxane was stirred under a reflux condenser for 2 ¾ hours. After stirring at room temperature for 1 ½ hours the mixture was stirred at the boiling point for 1 ½ hours. Volatiles were removed with an aspirator. The residue was distilled at 12mm pressure until the temperature of the distilland was 205°C. This product contained 3.1% chlorine, which corresponds to a molecular weight of 2290 or a value for a in formula 3 of 30.0. To 5.9 g of the distilland were added 25 ml of hexane containing 2.5 ml of ethanol and 2 ml of pyridine, and the product was washed in ether with dilute hydrochloric acid and water, and dried by evaporation. The residual alpha,Ω-dichloropoly(dimethylsiloxane) was found to have a molecular weight of 2450 which corresponds to a value of 32 for a in formula (3). This is in good agreement with the value of a calculated from chlorine content.

EXAMPLE 1

Preparation of Poly[4,4'-isopropylidenediphenyleneco-block-poly(-dimethylsiloxanediyl)sebacate]

To 45.6g of bisphenol A in 500 ml chlorobenzene and 50 ml of dry pyridine were added, with stirring for 35 minutes, 57.6g of the dichloropoly(dimethylsiloxane) prepared above. After stirring at 60° to 65°C for ¾ hour the mixture was cooled to room temperature and a solution of 47.8g of sebacyl chloride in 48 ml of chlorobenzene was added with stirring over 3½ hours. After stirring for an additional 1½ hours, the mixture was precipitated with methanol in a blender, washed with methanol, and dried in a vacuum at 50°C. The resultant block copolyester was a soft solid having an inherent viscosity of 0.35 as measured in chloroform at 25°C. The infrared spectrum showed strong bands at 5.74μ, 8.0μ, 9.5μ, and 12.5μ. The value of $a$ corresponding to formula (1) is 30, the value of $b$ is 2 to 3, the value of $c$ is about 5 to 6 and $d$ is greater than 2. R is octylene; A is the bisphenol residue; and $R^1$ and $R^2$ are methyl.

EXAMPLE 2

Preparation of a high molecular weight poly[4,4'-isopropylidenediphenylene-co-block-poly-(dimethylsiloxan ediyl) sebacate].

To 25.1g of bisphenol A in 43.5 ml of dichloroethane and 21.7g of dry pyridine were added, over a 14 minute period, 15.8g of alpha,Ω-dichloropolydimethylsiloxane having an average degree of polymerization of 20.4. The mixture was stirred for ½ hour at 60°C and cooled with rapid stirring. To the mixture were added 23.9g of sebacyl chloride in 24 ml of dichloroethane over a 7 minute period. After the mixture was stirred for 3 hours, it was blended with methanol and the solid filtered, washed with methanol and dried in a vacuum at 95° to 100°C. The product weighed 55.8 g and had an inherent viscosity in chloroform of 0.67. a of formula (1) in this case is 20.4, b is about 2, c is about 8 and d is greater than 2.

EXAMPLE 3

Preparation of Poly[1,4-butylene-co-block-poly(dimethylsiloxanediyl)sebacate]

To 9.0 g of 1,4-butanediol in 100 ml of dichloromethane and 30.3 g of triethylamine were added, with stirring over a ½ hour period, 27 g of alpha,Ω-dichloropolydimethylsiloxane having a degree of polymerization of 21.9. After stirring for ½ hour the mixture was cooled in ice and 23.9 g of sebacyl chloride in 24 ml of dichloromethane was added over 4 minutes. After one additional hour the mixture was blended with methanol and the solid was filtered, washed with methanol and dried in a vacuum at 95° to 100°C. The product recovered was 41g of block copolyester containing 19.9% Si and having an inherent viscosity in chloroform of 0.22. Corresponding to formula (1), A is butylene, R is octylene, $R^1$ and $R^2$ are methyl and a is 21.9, b is about 3, c is about 2 and d is greater than 2.

EXAMPLE 4

Preparation of Poly[4,4'-isopropylidenediphenylene-co-block-poly(dimethylsiloxanediyl)glutarate]

To 22.8g of bisphenol A in 250 ml of chlorobenzene and 25 g of dry pyridine were added, over a 13 minute period, 28.8g of alpha,Ω-dichloropolydimethylsiloxane having an average degree of polymerization of 47. After stirring for ½ hour at 60° to 65°C, the mixture was cooled and 16.9g of glutaryl chloride in 17 ml of chlorobenzene were added over a 16 minute period. After 2 hours the product was isolated by blending with methanols filtering the solid, washing with methanol and drying. The yield was 52.8 grams of solid polymer having an inherent viscosity in chloroform of 0.30 and containing 44.5% by weight of dimethylsiloxane. In this case, R is propylene and $a$ is 47, $b$ is about 2, $c$ is about 9.5, and $d$ is greater than 2.

EXAMPLE 5

Preparation of Poly[4,4'-isopropylidenediphenylene-co-block-poly(dimethylsiloxanediyl)adipate]

Adipyl chloride (18.3 g) was substituted for the glutaryl chloride in the method of Example 4 and the resulting block copolyester had an inherent viscosity in chloroform of 0.27 and contained 46% by weight polydimethylsiloxane. R is butylene in this example, and $a$, $b$, $c$, and $d$ are as in Example 4.

EXAMPLE 6

Preparation of Poly[4,4'-isopropylidenediphenylene-co-block-poly(dimethylsiloxanediyl)pimelate]

Pimeloyl chloride (19.7 g) was substituted for the glutaryl chloride in the method of Example 4 and the resulting block copolyester had an inherent viscosity in chloroform of 0.28 and contained 47.6% by weight polydimethylsiloxane. In this case R is pentylene and $a$, $b$, $c$, and $d$ are as in Example 4.

EXAMPLE 7

Preparation of films using dicarboxylic acids of less than 5 carbon atoms

An attempt to prepare poly[4,4'-isopropylidenediphenylene-co-block-poly(dimethylsiloxanediyl)succinate]wherein R is ethylene was made by adding to 22.8 g of bisphenol A in 114 ml of dichloromethane and 30.3 g triethylamine, 28.8 g of alpha,Ω-dichloropolydimethylsiloxane having an average degree of polymerization of 21.9 over a 10 minute period with stirring. After one half hour, 15.5 g of succinoyl chloride in 16 ml of dichloromethene were added and stirred over 4½ minutes. The mixture became extremely dark and when blended with methanol gave 34 g of black solid which was insoluble in chloroform, acetone, and tetrahydrofuran.

A further attempt was made to prepare poly[bisphenol A-co-block-poly(dimethylsiloxanediyl)fumarate] wherein R contains only 2 carbon atoms by adding to 22.8 g of bisphenol A in 250 ml of chlorobenzene and 25 g of dry pyridine, over a 17 minute period with stirring, 28.8 g of alpha,Ω-dichloropolydimethylsiloxane having an average degree of polymerization of 47. After ½ hour 15.3 g of fumaryl chloride and 20 ml of chlorobenzene were added and the mixture turned purple and then black. Blending with methanol gave 27.2 g of a soft solid which is insoluble in chloroform and acetone.

Substitution of fumaryl chloride by malonyl chloride wherein R contains only 1 carbon atom, in the above preparation yielded only a dark brown pourable fluid. Substitution of the fumaryl chloride by oxalyl chloride, wherein R contains no carbon atoms in the above preparation yielded a soft crumbly solid having an inherent viscosity of only 0.10 in chloroform.

EXAMPLE 8

Block copolyesters used as leveling agents for photoconductive compositions

To a 50 g aliquot of a photoconductive composition prepared from 108 g of Lexan 145 (a poly(4,4'-isopropylidenediphenylene carbonate), 72g of 4.4'-diethylamino-2,2'-dimethyltriphenylmethane, 5.4 g of 4-(4-dimethylaminophenyl)-2,6-diphenylthiapyrylium fluoroborate in 1020 g of dichloromethane was added 0.2 g of a 10% solution in dichloromethane of the block copolyester of Example 1.

The photoconductive element was prepared by coating a poly(ethylene terephthalate) film support with a nickel film having a thickness of 0.004 inch and overcoating with a subbing layer comprising a terpolymer of 83% vinylidine chloride, 15% methyl acrylate and 2% itaconic acid, by weight.

The above photoconductor was compared with the same photoconductor prepared without the addition of the block copolyester of Example 1 for surface smoothness and electrical H & D speed.

Surface smoothness was determined by visual comparison and by using a Bendix profilometer. The surface of the photoconductoor without the block copolyester was very rough and the surface of the photoconductor containing the block copolyester as an abdendum was very smooth. The profilometer values (measured using a 0.1 gram stylus having a 0.0005 inch radius) show a one quarter peak-to-valley distance of 10 to 12$\mu$ inches for the photoconductor without the block copolyester and a distance of only 2 to 3$\mu$ inches for the photoconductor containing the addendum. This quantitatively corroborates the visual comparison noted above.

The electrical H & D speed measurement illustrated that no loss of electrical properties was sustained by the addition of the block copolyester. The loss of charge after exposure to light is measured as the electrical H & D speed. To determine the speed of the element, it is electrostatically charged under a corona source until the surface potential, as measured by an electrometer probe, reaches some suitable initial value $D_o$, typically about 600 volts. The charged element is then exposed to a 3,000 degree K tungsten light source through a stepped density grey scale. The exposure causes reduction of the surface potential of the element under each step of the grey scale from its initial potential $V_o$ to some lower potential V the exact value of which depends upon the amount of exposure in meter-candle-seconds received by the area. The results of these measurements are then plotted on a graph of surface potential V versus log exposure for each step, thereby forming an electrical characteristic curve. The electrical or electro-photographic speed of the photoconductive composition is then expressed in terms of the reciprocal of the exposure required to reduce the surface potential to any fixed selected value. The actual positive or negative shoulder speed is the numerical expression of $10^4$ divided by the exposure in meter-candle-seconds required to reduce the initial surface potential $V_o$ by 100 volts. This is referred to as the 100 volt shoulder speed. Similarly the actual positive or negative toe speed is the numerical expression of $10^4$ divided by the exposure in meter-candleseconds required to reduce the initial potential $V_o$ to an absolute value of 100 volts. An apparatus useful for determining the electrophotographic speeds of photoconductive compositions used herein is described in Robinson et al U.S. Pat. No. 3,449,658 issued June 10, 1969.

The positive and negative shoulder and toe (+SH/+TOE)speed without the block copolyester was 27,000/4,000 and the +SH/+TOE speed for the photoconductor containing the block copolyester was 28,000/3,800 and the -SH/-TOE (negative charge) for the photoconductor without the block copolyester was 10,000/3,100 and for the photoconductor containing the block co-polyester was 9,500/3,000. This shows that no significant loss in electrical properties was sustained by the addition of the block copolyester.

The block copolyester is compatible with a wide range of polymers used as binders for photoconductive layers such as polycarbonates, polyesters, poly(vinylidene chloride), poly(methyl methacrylate) and poly(vinylbutyral) such as those described in U.S. Pat. No. 3,438,773 by Hioshi et al. issued Aug. 15, 1969, and U.S. Pat. No. 2,901,348 by Dessauer issued Aug. 25, 1959.

EXAMPLE 9

Utility of the block copolyester for lithographic purposes.

Several poly(ethylene terephthalate) supports were coated with 50g each of a 16% solid solution containing 75% Vitel 101 (a poly[4,4'-isopropylidenebis(phenoxyethyl)-co-ethylene terephthalate], 25% 4,4'-diethylamino -2,2'-dimethytriphenyl methane, 0.03% 4-(4-dimethylaminophenyl)-2,6-diphenylthiapyrylium perchlorate and 0.03% 2,6-bis(4-ethylphenyl)-4-(4-amyloxyphenyl)thiapyrylium perchlorate in a solvent containing 70% dichloromethane and 30% 1,1,2-trichloromethane and various amounts of a 10% solution of the block copolyesters of Example 1 in dichloromethane, each percentage being given on a weight basis, based on total weight.

The elements were inked with a hand roller using GPI Dri-Lith Ink. The ink differential between the abhesive photoconductor (desirably ink repelling) and the rough film support (ink accepting) was observed subjectively. Table 1 shows the results obtained.

TABLE 1

| No. | Concentration of Block Co-Polyester (Grams of 10% Solution | Inking Differential |
|---|---|---|
| 1 | 0 | 0 |
| 2 | 0.6 | Fair–Good |
| 3 | 1.2 | Good |
| 4 | 3.0 | Excellent |

The above shows that by using the block copolyesters as addenda for the plate, ink is repelled thereby showing a wide differential in inking from the raw support while the photoconductor without the block co-polyester showed no differential in inking from the plate to the photoconductor.

EXAMPLE 10

Block copolyester as an additive for photoconductive films

To 50 g aliquots of a photoconductive composition prepared from 108 g of Lexan 145, 72g of 4,4'-diethylamino-2,2' dimethyltriphenylmethane, 5.4 g of 4-(4-dimethylaminophenyl)-2,6-diphenylthiapyrylium fluoroborate in a 60/40 mixture by weight of dichloromethane and 1,1,2-trichloroethane were added various amounts of a 10% by weight solution in dichloromethane of the block copolyester of Example 1. The films were tested for permanent toner deposition by placing the films in close proximity with a magnetic brush containing electrostatic toner on an iron carrier and exposing the films to this treatment for 10 minutes. The films were then visually inspected to determine the amount of toner picked up by each film.

Table 2 shows the results of the permanent toner deposition test.

TABLE 2

| No. | Grams of 10% Solutions of Co-Polyesters | Permanent Toner Deposition |
|---|---|---|
| 1 | 0 | Severe |
| 2 | 0.225 | None |
| 3 | 0.45 | Very Slight |

Thus it is seen, that there is a significant improvement in permanent toner deposition for films containing the block copolyester of this invention.

EXAMPLE 11

Poly[1,4-butylene-co-block-poly(dimethylsiloxanediyl)sebacate]as addenda to photoconductors To a 50g aliquot of a photoconductive formulation comprising 108 g of Lexan 145, 72 g of 4,4'-diethylamino-2,2'-dimethyltriphenyl-methane, 5.4 g of 4-(4-dimethylaminophenyl)-2,6-diphenylthiapyrylium fluoroborate in 1020 g of dichloromethane was added 0.2 g of a 10% by weight solution in dichloromethane of the block copolyester of Example 3.

The above photoconductor was compared to the same photoconductor formed without the addition of the block copolyester and the surface smoothness and electrical H&D speeds were measured as in Example 8. The results are shown in Table 3.

TABLE 3

| No. | Grams of Block Co-Polyester | Electrical H and D Speed (SH/100V Toe) + | Electrical H and D Speed (SH/100V Toe) − | Surface Smoothness | Profilometer Value ($\mu$inches) |
|---|---|---|---|---|---|
| 1 | 0 | 29,000/3.200 | 10,000/2,600 | Very Rough | 11 |
| 2 | 0.2 | 25,000/2,200 | 11,000/2,800 | Very Smooth | 2.5 |

It is noted that while organic photoconductors were used in the above examples, photoconductive formulations incorporating inorganic photoconductors such as ZnO, CdS, PbO, Se and the like are also enhanced by the addition of the leveling agents of this invention.

The novel block copolyesters of this invention are useful as leveling agents and as release agents for many purposes. For example the block copolyesters may be used as overcoats for the insulating layer of a receiver sheet or receiver for the transfer of an undeveloped or developed charge pattern from a reuseable photoconductor. The block copolyesters are particularly useful as addenda for photoconductive elements.

This invention has been described in detail with particular reference to certain preferred embodiments thereof but it will be understood that variations and modifications can be effected within the spirit and scope of this invention.

We claim:

1. A solvent-soluble block copolyester having a molecular weight of at least 10,000 and an inherent viscosity greater than 0.2 in chloroform, and having the formula:

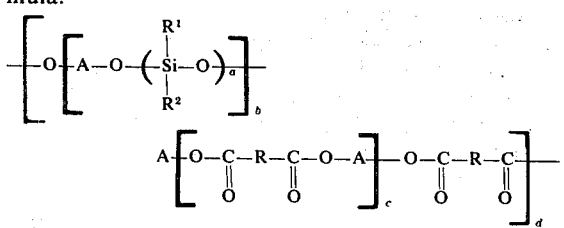

wherein R is an alkylene radical containing at least 3 carbon atoms, A is selected from the group consisting of alkylene radicals containing from about 2 to about 25 carbon atoms, and arylene radicals containing from about 6 to about 25 carbon atoms derived from aromatic diols, $R^1$ is an alkyl radical containing from about 1 to about 10 carbon atoms, and $R^2$ is selected from the group consisting of $R^1$, phenyl, naphthyl, and anthracenyl and aralkyl wherein the alkyl portion contains from 1 to 10 carbon atoms and alkaryl wherein the alkyl portion contains from 1 to 10 carbon atoms, $b$ is an integer of at least 1, $a$ is an integer of at least 10, $c$ is an integer of at least 2, and $d$ is an integer of at least 2.

2. The block copolyesters of claim 1 wherein A is an arylene radical having the formula:

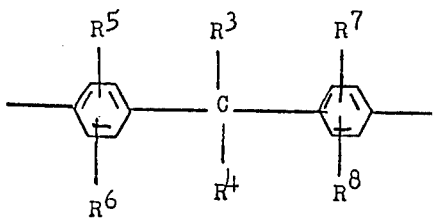

wherein $R^3$ and $R^4$ are selected from the group consisting of hydrogen atoms, substituted and ubsustituted alkyl radicals, and substituted and unsubstituted aryl radicals and $R^3$ and $R^4$ taken together with the carbon atom to which they are attached may represent a monocyclic, bicyclic or heterocyclic moiety, and $R^5$, $R^6$, $R^7$ and $R^8$ are independently selected from the group consisting of hydrogen atoms, substituted and unsubstituted alkyl radicals, substituted and unsubstituted aryl radicals, halogen atoms, cyano radicals, dialkylamino radicals, and alkoxy radicals.

3. The block copolyester of claim 1 where $R^1$ and $R^2$ are each methyl.

4. The block copolyester of claim 1 wherein A is butylene.

5. The block copolyester of claim 1 wherein a is a number from about 10 to about 200.

6. The block copolyester of claim 1 wherein R is octylene.

7. The block copolyester of claim 1 wherein R propylene.

8. The block copolyester of claim 1 wherein the molecular weight is from at least 10,000 to greater than 1,000,000.

9. The block copolyester of claim 1 wherein R contains from about 3 to about 20 carbon atoms.

10. The block copolyester of claim 1 wherein a is from about 10 to about 200, b is from about 1 to about 25, c is from about 2 to about 20, and d is from about 2 to about 1,000.

11. A solvent-soluble block copolyester having a molecular weight of at least 10,000, and an inherent viscosity greater than 0.2 in chloroform, and having the formula:

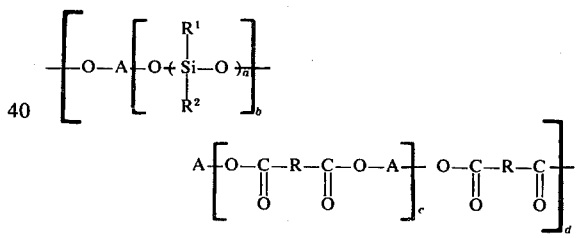

wherein R is an alkylene radical containing 3 to 20 carbon atoms, A is selected from the group consisting of alkylene having 2 to 20 carbon atoms and bisphenylene radicals, $R^1$ and $R^2$ are alkyl radicals containing 2 to 10 carbon atoms, a is an integer of 10 to 200, b is an integer of 1 to 25, c is an integer of 5 to 20, and d is an integer of 2 to 1000.

12. A solvent-soluble block copolyester having the formula:

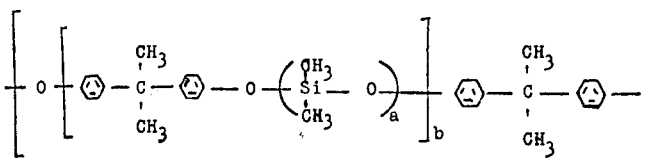

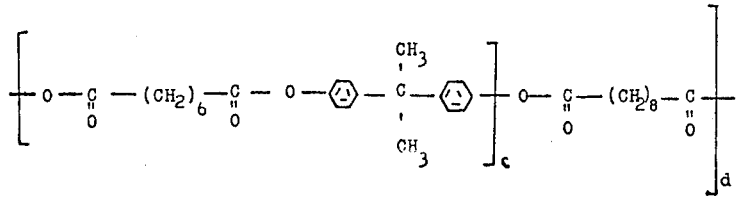

wherein *a* is from about 10 to about 200, *b* is from about 1 to about 25, *c* is from about 5 to about 20 and *d* is from about 2 to about 1000.

13. A method of preparing a solventsoluble block copolyester having a molecular weight of at least 10,000 and an inherent viscosity of at least 0.2 in chloroform comprising reacting (1) an alpha, omega-dihalo-polydiorganosiloxane comprising from about 10 to about 200 chemically combined diorganosiloxy units consisting essentially of organosiloxy units wherein each of the silicon atoms has two hydrocarbon radicals attached through a carbon-silicon bond wherein at least one of said hydrocarbon groups is an alkyl group and (2) an aliphatic or aromatic diol and subsequently reacting the reaction product of (1) and (2) with an aliphatic dicarboxylic acid halide containing at least 5 carbon atoms.

14. The method of claim 13 wherein the alpha,Ω-dihalo-polydiorganosiloxane is alpha,Ω-dichloro-polydialkyl siloxane and the diol is an alkylene diol containing from about 2 to about 20 carbon atoms or dihydric phenol.

15. The method of claim 14 wherein the alkylsiloxy units are dimethylsiloxy units.

16. The method of claim 14 wherein the diol is a dihydric phenol.

17. The method of claim 16 wherein the dihydric phenol is 2,2-bis(4-hydroxyphenyl)propane.

18. The method of claim 14 wherein the diol is butylene glycol.

19. The method of claim 13 wherein the aliphatic dicarboxylic acid halide is sebacyl chloride.

20. The method of claim 13 wherein the aliphatic dicarboxylic acid halide is adipyl chloride.

21. The method of claim 13 wherein the reaction of the alpha,Ω-dihalo-polydiorganosiloxane with the diol is carried out in the presence of a solvent at room temperature.

22. The method of claim 21 wherein the solvent is a chlorinated hydrocarbon.

23. The method of claim 13 wherein the reaction of diol-alpha,Ω dihalo-polydiorganosiloxane product with the dicarboxylic acid halide is carried out at room temperature in the presence of a solvent.

24. The method of claim 23 wherein the solvent is a chlorinated hydrocarbon.

25. The method of forming a solvent-soluble block copolyester comprising reacting, in a chlorohydrocarbon solvent, an alpha,Ω-dichloropolydimethylsiloxane with 2,2-bis(4-hydroxyphenyl)propane, and subsequently reacting the reaction product with sebacyl chloride in a chlorohydrocarbon solvent.

26. The method of forming a solvent-soluble block copolyester comprising reacting in a chlorohydrocarbon solvent an alpha,Ω-dichloropolydimethylsiloxane with butylene glycol and subsequently reacting the reaction product with sebacyl chloride in a chlorohydrocarbon solvent.

* * * * *

UNITED STATES PATENT AND TRADEMARK OFFICE
CERTIFICATE OF CORRECTION

PATENT NO. : 3,935,154

DATED : January 27, 1976

INVENTOR(S) : John D. Cawley

It is certified that error appears in the above-identified patent and that said Letters Patent are hereby corrected as shown below:

Column 3, approximate line 30, "O(Si" should read ---O$(\!\!$-Si---.

Column 5, line 32, "carbonsilicon" should read ---carbon-silicon---.

Column 7, line 49, "800G" should read ---800g---.

Column 8, line 4, "isopropylidenephenyleneco" should read ---isopropylidenediphenylene-co---, and "(-" at the end of the line should have been carried to the beginning of the next line.

Column 9, line 24 and line 35, and column 11, line 28, that part of formula reading "(-" should have been carried to the beginning of the next line.

Column 10, line 37, "photoconductoor" should read ---photoconductor---; and, lines 39-40, "abdendum" should read ---addendum---.

Column 11, line 9, "meter-candleseconds" should read ---meter-candle-seconds---.

UNITED STATES PATENT AND TRADEMARK OFFICE
CERTIFICATE OF CORRECTION

PATENT NO. : 3,935,154
DATED : January 27, 1976
INVENTOR(S) : John D. Cawley

It is certified that error appears in the above-identified patent and that said Letters Patent are hereby corrected as shown below:

Column 13, line 43, before "b", ---wherein not more than one of $R^1$ and $R^2$ contain aromatic moieties--- should be inserted.

Column 15, line 4, "solventsoluble" should read ---solvent-soluble---.

Signed and Sealed this first Day of June 1976

[SEAL]

Attest:

RUTH C. MASON
Attesting Officer

C. MARSHALL DANN
Commissioner of Patents and Trademarks